Feb. 11, 1936.  W. J. KERR ET AL  2,030,451

TIME CYCLE CONTROLLER

Filed Jan. 2, 1934  3 Sheets-Sheet 1

INVENTORS
WILLIAM J. KERR AND
EDWARD C. MILLER
BY
ATTORNEY

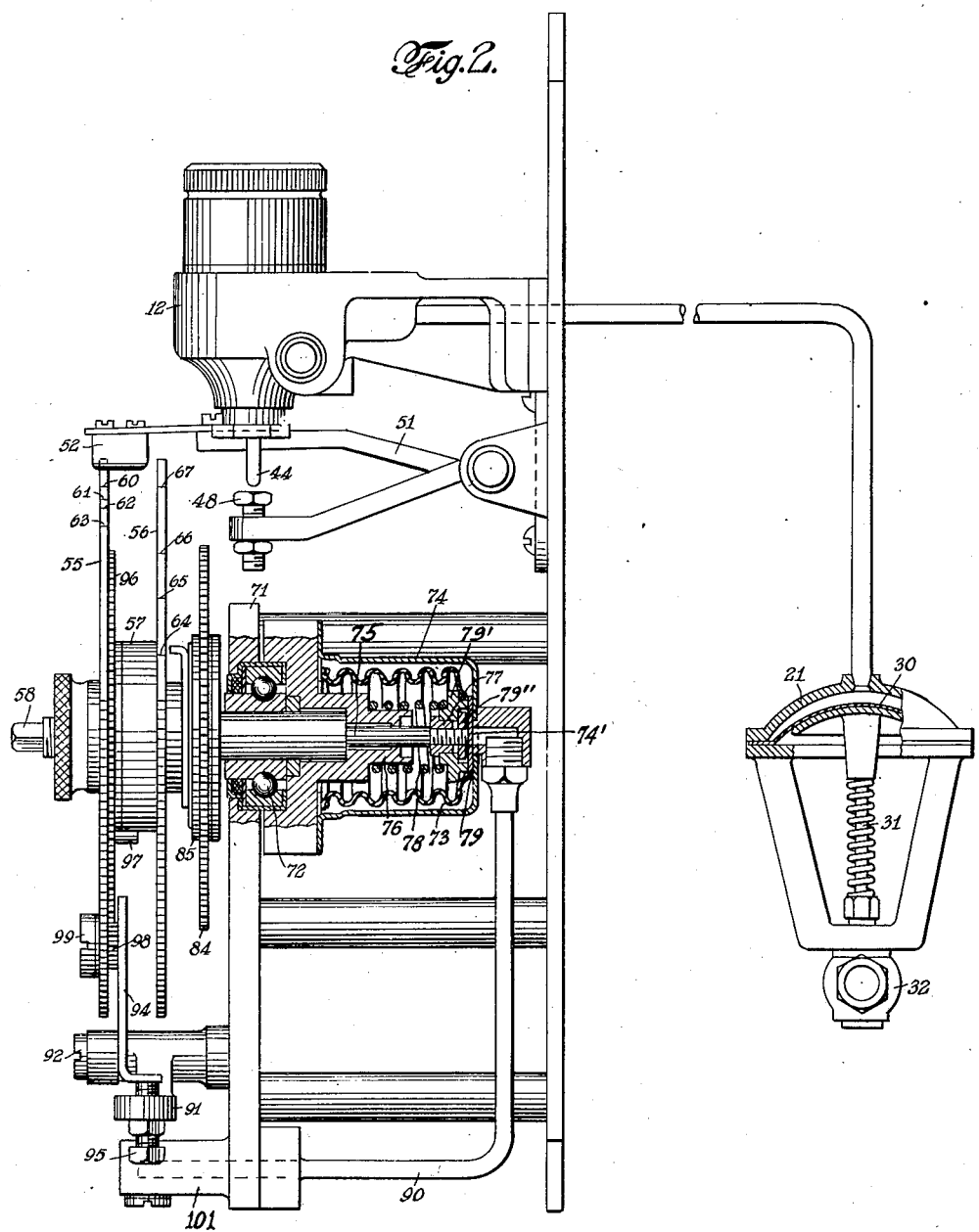

Feb. 11, 1936. W. J. KERR ET AL 2,030,451
TIME CYCLE CONTROLLER
Filed Jan. 2, 1934 3 Sheets-Sheet 3
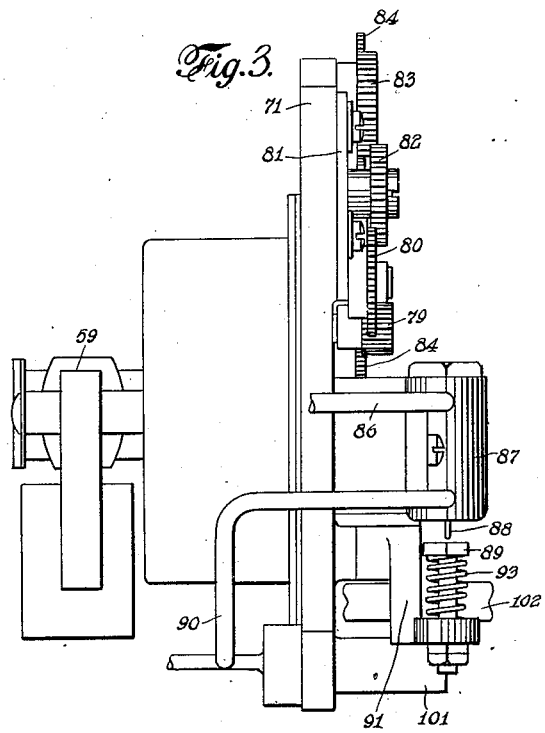
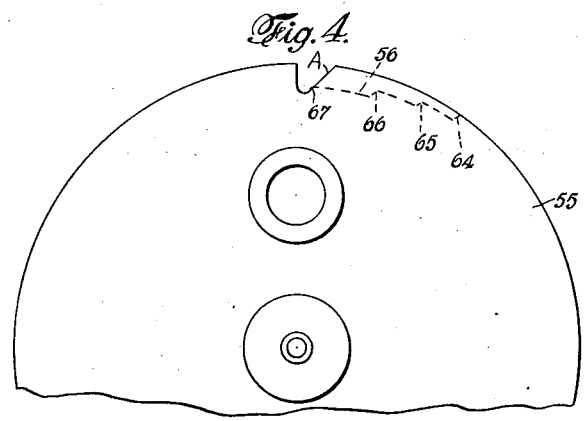
INVENTORS
WILLIAM J. KERR AND
EDWARD C. MILLER
BY
ATTORNEY Patented Feb. 11, 1936                                                                 2,030,451

UNITED STATES PATENT OFFICE 2,030,451

TIME-CYCLE CONTROLLER

William J. Kerr, Waterbury, and Edward C. Miller, Naugatuck, Conn., assignors to The Bristol Company, Waterbury, Conn., a corporation of Connecticut Application January 2, 1934, Serial No. 705,036

10 Claims. (Cl. 161—7)

The invention relates to time-cycle control apparatus whereby an automatic control is had of discontinuous processes, for example, such as utilize mechanisms operated by fluid agencies or by electrical energy, and wherein the flow of such operating medium to these mechanisms is controlled primarily by relatively small valves or pilot means and the like, which are under the control of a cam or group of cams, or equivalent means, driven by a low-power constant-speed motor.

The present invention has for an object the provision of novel means for affording an adjustment of the relative times of occurrence of the several events entering into the complete cycle of operations of the process or machine under control. Such adjustment of the total time of the cycle to meet the needs of varying conditions of production presents a difficult problem in that positive and continuously variable speed transmissions are disproportionately expensive, while selective-speed gear trains are limited in the number of settings available, the complications and cost involved as the number of speeds increases becoming prohibitive.

The invention has for a still further object the provision of a simple and readily manipulated means, whereby the total time of the process may be adjusted to any desired value within the range of the instrument.

Another object of the invention resides in the provision of a graduated dial forming part of the instrument, and from which the value of the time interval desired may be read and selected.

Still another object of the invention resides in the provision of a mechanism for effecting the aforesaid adjustment in such a manner that the relative timing of certain events in the cycle, for example, those at the beginning and those at the end of the process, is fixed, the variable element being introduced only between these events. That is to say, while the angular velocity of the cam at any instant, including the intervals covering the initiation and the termination of the cycle, is constant, the time lapse between the occurrence of the group of events which characterize its end is caused to be varied according to a predetermined setting of the instrument.

In carrying out the invention, means are provided whereby the total time of the cycle is divided into two substantially equal intervals, during one of which the controlling mechanism operates in one direction, and during the other in a reverse direction, the reversal being practically instantaneous; and provision is further made for adjusting the time in the cycle when the reversal of motion takes place. Associated with the controlling mechanism is a cam member having two adjacent working faces or contours for controlling the several events in the cycle, and provision is made for changing from one to the other of these working faces the engagement of a cam follower member, at the same time as reversal of rotation is effected.

In the accompanying drawings, Fig. 1 is a front elevation of the time-cycle control apparatus, suitably encased and with the door of the casing and other portion of the apparatus broken away, the connections from the apparatus to fluid controlling valves being also shown.

Fig. 2 is a side elevation with partial vertical section of the apparatus for shifting and reversing the cam member, and also of the associated pilot valve and fluid regulating valve controlled thereby.

Fig. 3 is a fragmentary side elevation of a portion of the operating mechanism, showing the gear train, the main driving motor and the reversing motor.

Fig. 4 is a front elevation of a portion of a modified cam assembly.

Figure 1:
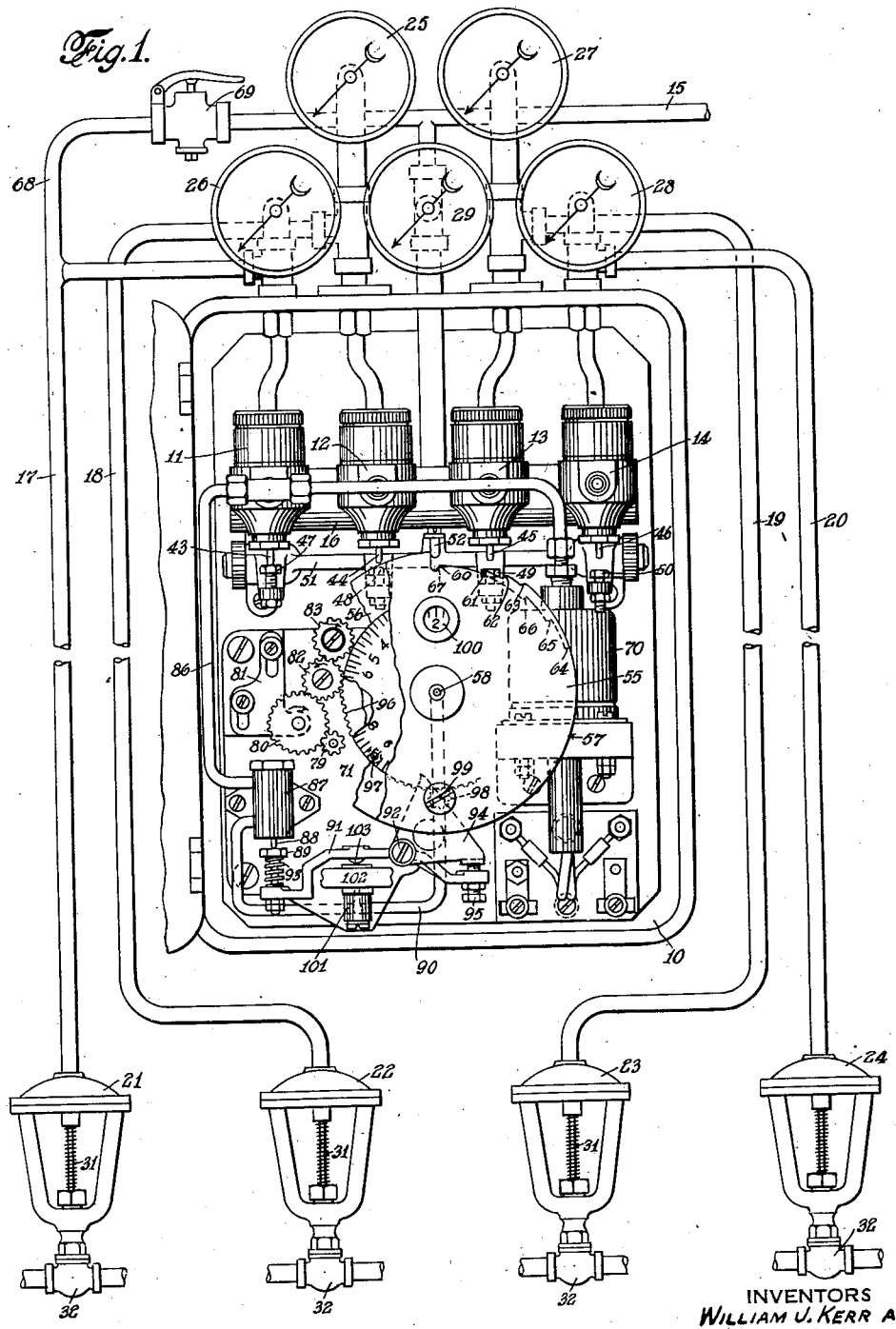

Referring to the drawings, 10 designates a suitable enclosing casing designed to house the time-cycle control apparatus and the pilot valves 11, 12, 13 and 14 which are controlled thereby. These pilot valves, in any well-known or special manner, are adapted to furnish to desired control valves a suitable actuating fluid, such as air, which is supplied thereto from the feed or supply pipe 15 and manifold 16, through outlet pipes 17, 18, 19 and 20 extending from their respective pilot valves 11, 12, 13 and 14, for example, to fluid control valves 21, 22, 23 and 24.

While but four of these pilot valves and associated control valves are indicated, it will, of course, be understood that the invention is not restricted to the number of these valves, which depends upon the number of operations it is desired to control. Each supply pipe, 17, 18, 19 and 20, furthermore, may be provided with a suitable pressure gauge as the gauges 25, 26, 27 and 28, respectively, and a pressure gauge 29 may be included in the feed or supply pipe 15.

Any suitable type of pilot valve may be employed for the purpose as well as any suitable type of the fluid control valve; and the valve 21, shown in Fig. 2 of the drawings, affords a satisfactory means for the latter purpose. Such a valve is provided with a flexible diaphragm 30 in its head and to which air under pressure from the corresponding pilot valve 11 is introduced when the latter valve is opened under the action of the control mechanism hereinafter described. Diaphragm 30 actuates a stem 31 of a valve disc or the like (not shown), for controlling the flow of a fluid through the valve body 32, as is well understood.

As a particularly satisfactory form of pilot valve for the purpose, the valve 12 shown in Fig. 2 may be utilized, the same being substantially similar to the one described in U. S. Letters Patent 1,890,494 granted to applicants' assignee.

To elevate the stems of the respective pilot valves 11, 12, 13, and 14 in the desired sequence, the following cam mechanism is provided:

Each of the stems 43, 44, 45 and 46 of the respective pilot valves is adapted to be engaged by respective tappets 47, 48, 49 and 50, which are adjustably mounted upon a rocker arm 51. The latter carries a cam follower 52 designed to engage the periphery of one or the other of two cam plates 55 and 56, together forming a cam member 57 mounted to rotate with a shaft 58, which is driven, through intermediate mechanism, from a constant-speed electric motor 59, which may be of the well-known "Telechron" type.

Each of the cam plates 55 and 56 is stepped at a portion of its periphery, as for example, at 60, 61, 62 and 63 on cam plate 55, the latter step representing the greatest radius. Further steps 64, 65, 66 and 67 are provided on the periphery of cam plate 56 and are displaced angularly with respect to the former steps, with the radius at the portion 64 equal to that at the portion 63, and the least radius of the cam plate 56 at the portion 67 equal to the radius of the cam plate 56 at the portion 60. Since, as will hereinafter be set forth, when the cam follower 52 is actuated by the steps on cam plate 55, the shaft is rotating in a counterclockwise sense, and when actuated by the cam plate 56 in a clockwise sense, it follows that the several movements of the cam follower 52, as initiated by the steps 64 to 67 will be similar to, but in reverse order to, those initiated by the steps 60 to 63.

Where it is desired that several events in the cycle be made to occur in rapid succession, the corresponding steps may be merged into a continuous slope as at "A", Fig. 4. Here the individual steps 60, 61, 62 and 63 are replaced by a sloped contour, so that during the beginning of a cycle, the rocker shaft 51 moves continuously, and the several events are initiated as the corresponding pilot valves are successively unseated.

These groups of steps correspond respectively to the initiating and terminal operations involved in a complete cycle, the intermediate high portion, (partially on the periphery of cam-plate 55 and partially on that of cam-plate 56) accommodating the main operation or period of principal activity, and in which a variation of duration is desirable.

In accordance with the position of the follower 52 relatively to these stepped portions of the cam will the rock-shaft be positioned for causing the tappets carried thereby to engage the different stems of the pilot valves, all of which is well understood and forms no particular part of the present invention, which is concerned more especially with the arrangement for reversing the rotational direction of the cam member and simultaneously therewith changing the engagement of the cam follower from one to the other of the cam plates constituting the cam member.

When the follower 52 rests upon the portion of the cam adjacent the step 60 and of minimum radius, the arrangement is such that the motor 59 will be at rest, and no rotation of the cam is effected.

As a convenient means of initiating the operations through starting of the motor 59, a by-pass connection 68 may be taken around the pilot valve 11 through the provision of a manually operable feed-valve 69 connected to the feed pipe 15 and by-pass. This valve is maintained open for a period sufficiently long to enable the follower to reach the first step 60 of the cam, whereupon the valve 69 may be closed and continued so throughout the remainder of the cycle. By thus by-passing the pilot valve 11, fluid pressure is directed to a pressure-operated switch device 70 of any well known or special type designed to close the motor circuit of the motor 59 through switch contacts (not shown) and adapted to be bridged upon the application of pressure to the switch device, for example, a switch device of the type indicated in U. S. Letters Patent #1,542,293.

The shaft 58, upon which is mounted the cam member 57, is journalled in a mounting plate 71 by means of a bearing member 72, and through which the shaft is free to slide axially for a limited range. Carried upon the rearward face of the mounting plate is an assembly comprising a metallic bellows 73 enclosed within a sealed cup or chamber 74, so that when fluid under pressure is admitted to the annular space between the bellows and the wall of the chamber said bellows will be compressed toward the front of the instrument. The shaft 58, furthermore, projects rearwardly in the form of an extension 75 of reduced diameter and passing through a guide bushing 76 into a collar 77 carried within the bellows 73 and located over the further reduced portion and threaded end of the shaft. This end is held, by means of a compression spring 78, into engagement with the interior flat wall of the cup, or rather with a disk 79 at the outer end of the bellows, said spring acting against a recessed member 79' loosely fitted over the collar and surrounding a nut 79" working on the said threaded end of the shaft and adapted to retain member 79' upon the collar with a running fit, as well as retaining said collar to the shaft. Thus, when no pressure is applied to the exterior surface of the bellows, the shaft 58 and all parts carried thereby will be held by the influence of the extended spring 78 in its extreme position toward the rear of the instrument and forcing the said shaft end and member 79' together with the said disk 79 against the inner flat wall of cup 74 without imposing any tendency to bind the shaft against rotation. When fluid pressure is admitted to the space within the chamber 74, through the axial opening 74' at its outer end, the force of the spring 78 will be overcome and the bellows collapsed, the shaft then being urged to its other extreme position, toward the front of the instrument, and located for free rotation.

The axial travel of the shaft in each direction is limited by the wall of the chamber 74 and the end of the bushing 76 respectively; and these are so proportioned that with the shaft in its rearward position the cam follower 52 rests upon and engages the periphery of cam-plate 55, while with the shaft at its other extreme, the cam-plate 56 is engaged by the cam follower.

Rotary motion is imparted to the shaft 58 from the motor 59 through a gear train consisting of a pinion 79 carried upon the motor shaft, an idler 80 borne on an adjustable mounting plate 81, and a gear member 82 driven from the idler and itself driving a gear member 83. A relatively thin gear 84 is carried upon the shaft 58 by a friction mounting 85, and it is so designed and located that its pitch circle may touch those of both the gear members 82 and 83. These gear members, however, being in offset relationship, as shown in Fig. 3, it will be seen that the gear 84 will mesh with one or the other of the gear members 82 and 83, according to which of its extreme axial positions it occupies, but that it cannot at either of these positions mesh with both gear members simultaneously.

Since gear members 82 and 83 are arranged to rotate in opposite directions, as indicated by the arrows, it follows that the direction of rotation of the shaft 58 and the cam assembly carried thereby will depend upon the axial position of the shaft, or rather gear 84 carried thereon. Admission of fluid pressure to the chamber 74 will, therefore, not only shift the engagement of cam follower 52 from one cam plate to the other, but will also reverse the rotational direction of the whole cam member.

Thus, having a cycle of events initiated by the several steps on cam-plate 55, and the process continuing with the follower resting upon the maximum radius of the cam-plate, admission of fluid pressure into the chamber 74 will cause the cam to reverse and the cycle to be completed with the follower resting upon the periphery of the cam-plate 56, the instant of reversal marking substantially the middle point of the cycle.

Means by which the reversal and shifting of the cam member is automatically accomplished and positively timed will now be described: Assuming the fluid-pressure elements of the mechanism to be pneumatically actuated, air passing the pilot valve 11 is arranged to be carried through a feed-pipe 86 to a valve 87, so that at any time the valve 11 is open, a supply of air is also available at valve 87. This valve, which may be similar in construction to the pilot valves 11, 12, etc., has a stem 88 arranged to be actuated by a tappet 89 and to admit air through a pipe 90 to the chamber 74, actuating bellows 73 and urging thereby the shaft 58 to its forward position. The tappet 89 is carried on an arm 91, swinging about the stationary pivot 92, and is supported by a compression spring 93, so that in event of the arm 91 swinging beyond the range of travel of the valve-stem 88, the spring will yield and prevent straining of the parts. A dog 94, also pivoted at 92, engages the arm 91 through an adjustable screw 95 and projects upwardly behind the cam-plate 55.

Concentrically and frictionally mounted upon the cam-plate 55 is a gear member 96, having upon its rearward face a pin 97 adapted to engage and actuate the dog 94 as the gear is carried around by the cam. A pinion 98, journalled within the cam-plate 55, meshes with the gear member 96, so that when it is rotated by a slotted screw-head 99 whose shaft projects through the cam-plate, the gear member will be rotated relatively to the cam, changing the angular position of the pin 97 in relation to the steps on the peripheries of the camming elements.

The gear member 96 may be provided with graduations on its forward face, as shown, and made visible through the provision of a window 100 pierced through the cam-plate 55, thus providing an indication of the position of the pin relatively to the cam, and therefore of the time after the initiation of the cycle at which the valve 87 will be actuated and the cam simultaneously shifted and reversed.

Supported near the lower side of the mounting plate 71 is a hollow bracket 101, having its interior in communication with the pipe 90, and carrying an expansible metal capsular spring 102 positioned directly beneath the arm 91. The movable surface of the capsular spring engages a boss 103 on the lower side of the arm 91, so that when air is admitted to the capsular spring the arm 91 is elevated, thus holding the stem 88 of the valve 87 in the open position.

The friction mounting 85 permits the shaft 58 and associated parts to be set at any time without disturbing the gear train; and the dog 94, being pivoted independently of the arm 91, permits the cam and the gear member 96, carrying the pin 97, to be rotated backwardly without straining of any of the parts.

The performance of the reversing mechanism as a part of the cycle of operation is as follows: Upon the cycle being initiated and the cam put into operation in a counter-clockwise sense, as already set forth, rotation of the cam continues, and the several events of the cycle are caused to take place as the respective pilot valves are opened by the progressive increase in cam-plate 55, and the main operation under control put into effect. As the cam continues to rotate, the gear member 96 is carried integrally around with it, and the pin 97 approaches the dog 94, which lies directly in its path. Upon the lapse of a time interval depending upon the angular position to which the pin 97 has been set in relation to the steps on the cam periphery, the dog 94 is engaged by the pin 97, causing the arm 91, through the tappet 89, to lift the stem 88 of the valve 87.

The previous opening of the pilot valve 11 having admitted air to the feed pipe 86, the opening of valve 87 will admit air through the pipe 90 to the chamber 74, causing the cam member to be shifted, so that the follower 52 is transferred from the periphery of cam-plate 55 to that of cam-plate 56, and the rotational direction of the cam reversed as hereinbefore set forth. At the same time, air admitted to the capsular spring 102 from the pipe 90 through the hollow bracket 101 causes the capsular spring 102 to expand and serve as a support to the arm 91. As the cam reverses and the pin 97 recedes from the dog 94, the valve 87 will thus be retained in its open position, and the clockwise rotation of the shaft will continue until the termination of the cycle.

The last event of the cycle as the cam follower 52 passes the step 67 on the cam-plate 56, is the closing of pilot valve 11, which not only terminates the cycle of operations of the apparatus controlled by the diaphragm-motor valve 21, but, by removing pressure from the switch 70 brings the driving motor 59 to rest. Also, by removing pressure from the pipes 86 and 90 the bellows 73 in the chamber 74 is caused to respond to the influence of the spring 78, shifting the cam-plate 55 into engagement with the follower 52, and re-establishing the gear train for counter-clockwise rotation. At the same time, collapse of the bellows 102 allows the arm 91 to return to its normal position, closing the valve 87 and thus making the system ready for initiation of the succeeding cycle of operations.

The graduations on the gear member 96, as visible through the window 100, will be evenly divided in units of time, and will actually represent double the time corresponding to the angle between the instant of starting the cycle and that of engagement of the pin 97 with the dog 94. Thus, with the setting at "2", as shown in Fig. 1, the reversing mechanism will be tripped upon the lapse of one unit as a minute from the starting time; but, the return speed being the same as the initial speed, the total time of the cycle will be two minutes. In the same manner, any setting of the gear member 96, made by rotating the slotted head 99, and indicated by the graduation visible through the window 100, will represent the total lapse of time from the beginning to the end of the cycle; and, so long as reversal does not take place while the cam follower 52 is on any of the lower steps of the cam contours, the relative timing of the initiatory events or of the terminating events will not be disturbed.

We claim:

1. In a time-cycle controller embodying pilot means, devices controlled thereby, and means for actuating the pilot means: a cam having a plurality of axially displaced surfaces adapted for engagement with the said actuating means, means to rotate the cam substantially continuously during a complete cycle including a reversal of the rotation thereof, means including between the said rotating means and the cam for changing its direction of rotation, means movable with the cam for determining the time of reversal of the rotation of the cam, and means controlled by the said movable means for effecting simultaneously with the reversal an axial displacement of the cam whereby its engagement with said actuating means is transferred from one to another of said surfaces.

2. In a time-cycle controller embodying pilot means, devices controlled thereby, and means for actuating the pilot means: mechanical means adapted to engage said actuating means and comprising a driving motor, rotating continuously in one direction during a complete cycle, and a cam rotated substantially continuously by the motor during the cycle, intermediate mechanism for effecting reversal of the direction of rotation of the cam, means controlled by the angular position of said cam for controlling the time of reversal of its rotation through said intermediate mechanism, and means for simultaneously therewith effecting an axial displacement of the cam, the latter being provided with two adjacent camming surfaces for engagement alternatively with the means for actuating the pilot means and in accordance with the axial position of the cam.

3. In a time-cycle controller embodying pilot means, devices controlled thereby, and means for actuating the pilot means: control means for the actuating means comprising a motor-operated cam driven in one direction of rotation during a predetermined time interval and in the reverse direction during an equal time interval, and fluid-pressure actuated means to axially displace the cam and simultaneously therewith to effect the reversal of its direction of rotation.

4. In a time-cycle controller embodying pilot means, devices controlled thereby, and cam-operated means for actuating the pilot means: a motor operating in one direction of rotation during a predetermined time interval, a reversible cam driven from the motor for operating said means, means for automatically reversing the direction of rotation of said cam within said predetermined time interval, means for axially displacing the cam at the time of its reversal, means for adjusting the duration of the predetermined time interval, and means for indicating the value of the said time interval.

5. In a time-cycle controller embodying pilot means, devices controlled thereby, and cam-operated means for actuating the pilot means: a motor operating in one direction of rotation during a predetermined time interval, a reversible cam driven from the motor for operating said means, means for automatically reversing the direction of rotation of said cam within said predetermined time interval, means for axially displacing the cam at the time of its reversal, means for adjusting the duration of the predetermined time interval, and means wholly carried by the cam for indicating the value of the said time interval and including a graduated dial rotatable on the cam and whose graduations may be viewed through an aperture of the cam registering therewith.

6. In a time-cycle controller embodying pilot means, devices controlled thereby, and cam-operated means for actuating the pilot means: a motor operating in one direction of rotation during a predetermined time interval, a reversible cam driven from the motor for operating said means, means to translate the cam axially, and reverse gearing between said motor and the cam for rotating the latter in an angular sense dependent upon the axial position of said cam.

7. In a time-cycle controller embodying pilot means, devices controlled thereby, and cam-operated means for actuating the pilot means: a motor operating in one direction of rotation during a predetermined time interval, a reversible cam driven from the motor for operating said means, means for automatically reversing the direction of rotation of said cam within said predetermined time interval, fluid-pressure actuated means for translating said cam axially, means adjustably carried by the cam for effecting energization of the fluid-pressure actuated means, and additional means controlled by the cam for effecting de-energization of said fluid-pressure actuated means.

8. In a time-cycle controller embodying pilot means, devices controlled thereby, and mechanically-operated means for actuating the pilot means: a motor operating in one direction of rotation during a predetermined time interval, a reversible shaft driven from the motor for operating said means, means to translate said shaft axially, a plurality of sets of adjacent camming surfaces carried by the shaft adapted for engagement with the said means for actuating the pilot means alternatively in accordance with the axial position of the shaft, and means for automatically reversing the rotation of the shaft simultaneously with its translation.

9. In a time-cycle controller embodying pilot means, devices controlled thereby, and mechanically-operated means for actuating the pilot means: a motor operating in one direction of rotation during a predetermined time interval, a rotatable and reversible cam shaft for operating said means, means to axially translate the shaft, gear members interposed between the motor and the cam shaft and one of which is movable with the cam-shaft to effect rotation of the shaft in opposite directions when at the corresponding extremes of the axial translation, and means rotating with the shaft to determine automatically its time of translation.

10. In a time-cycle controller embodying pilot means, devices controlled thereby, and means for actuating the pilot means: a cam having a plurality of axially displaced surfaces adapted for engagement with the said actuating means, means to rotate the cam substantially continuously during a complete cycle including a reversal of the rotation thereof, means included between the said rotating means and the cam for changing its direction of rotation, means movable with the cam for determining the time of reversal of the rotation of the cam, and means controlled by the said movable means for effecting simultaneously with the reversal an axial displacement of the cam whereby its engagement with said actuating means is transferred from one to another of said surfaces.

WILLIAM J. KERR.
EDWARD C. MILLER.